May 15, 1923.

A. J. BATES 1,455,062

AUTOMATIC HYDRAULIC CONTROL VALVE FOR EXPANDING MACHINES

Filed May 13, 1918

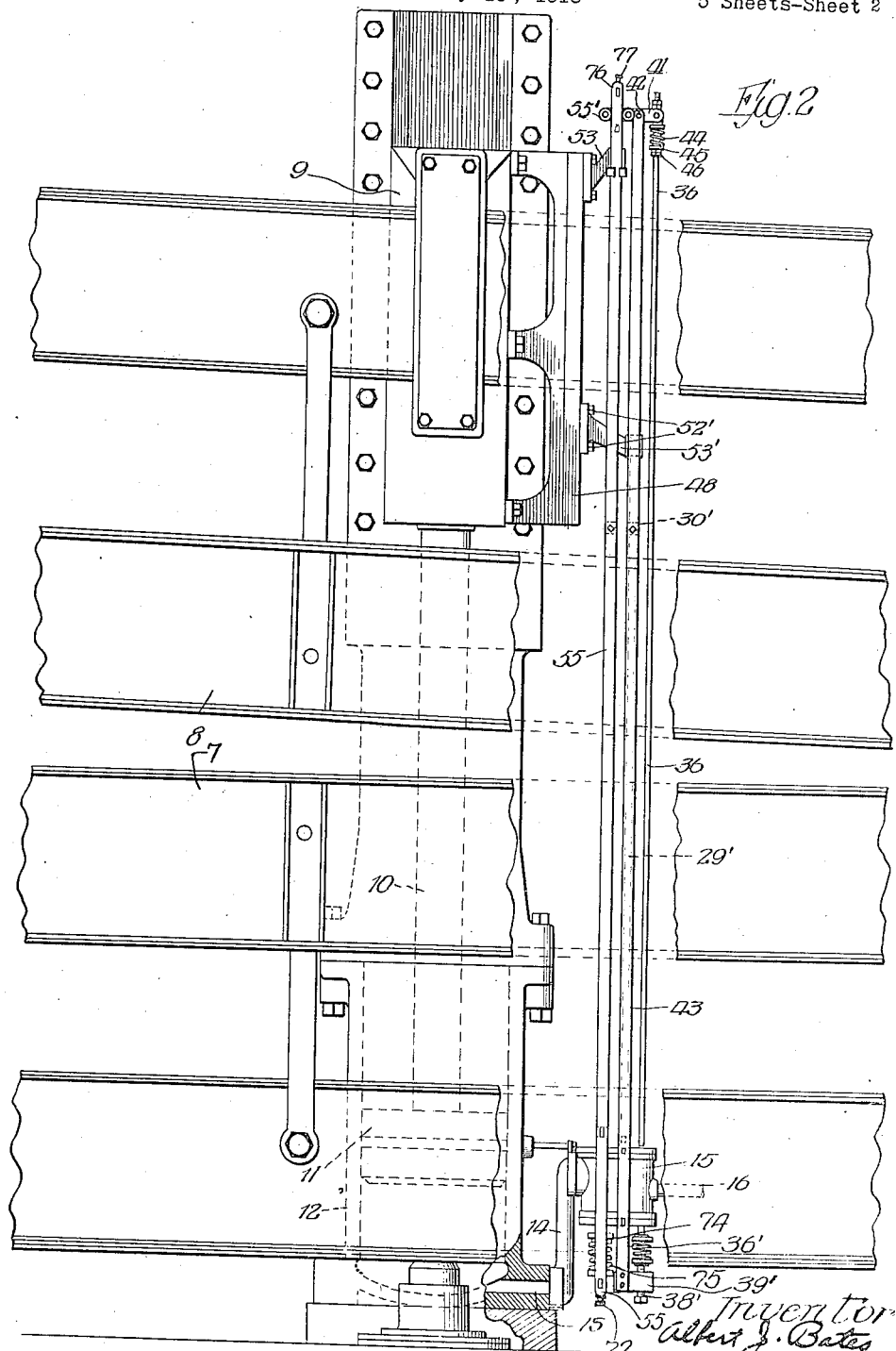

May 15, 1923.  
A. J. BATES  
1,455,062  
AUTOMATIC HYDRAULIC CONTROL VALVE FOR EXPANDING MACHINES  
Filed May 13, 1918  
5 Sheets-Sheet 3
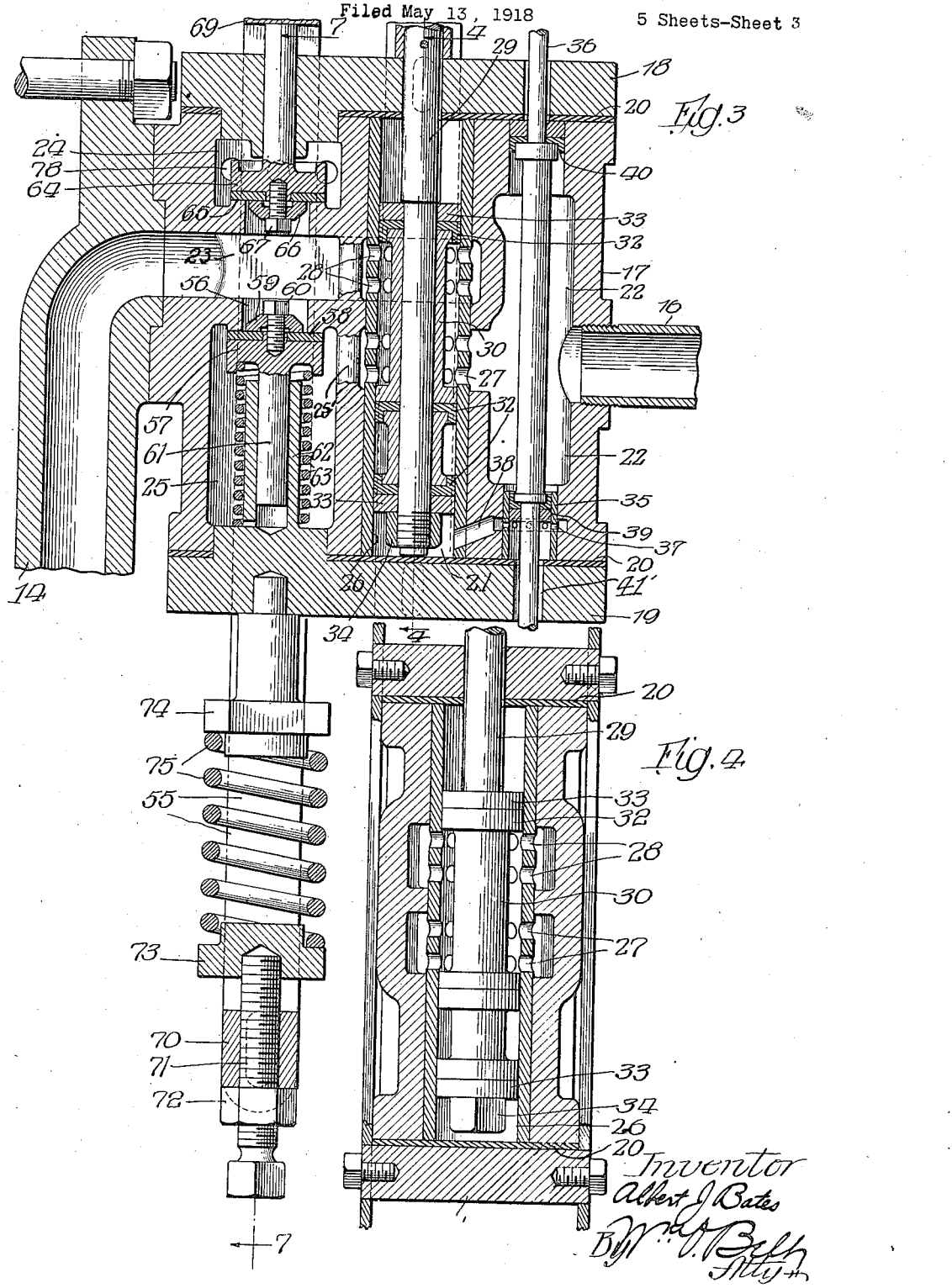

May 15, 1923.

A. J. BATES 1,455,062

AUTOMATIC HYDRAULIC CONTROL VALVE FOR EXPANDING MACHINES

Filed May 13, 1918    5 Sheets-Sheet 4

Inventor
Albert J. Bates
By Wm. J. Belt, Atty.

May 15, 1923.
A. J. BATES
1,455,062
AUTOMATIC HYDRAULIC CONTROL VALVE FOR EXPANDING MACHINES
Filed May 13, 1918    5 Sheets-Sheet 5
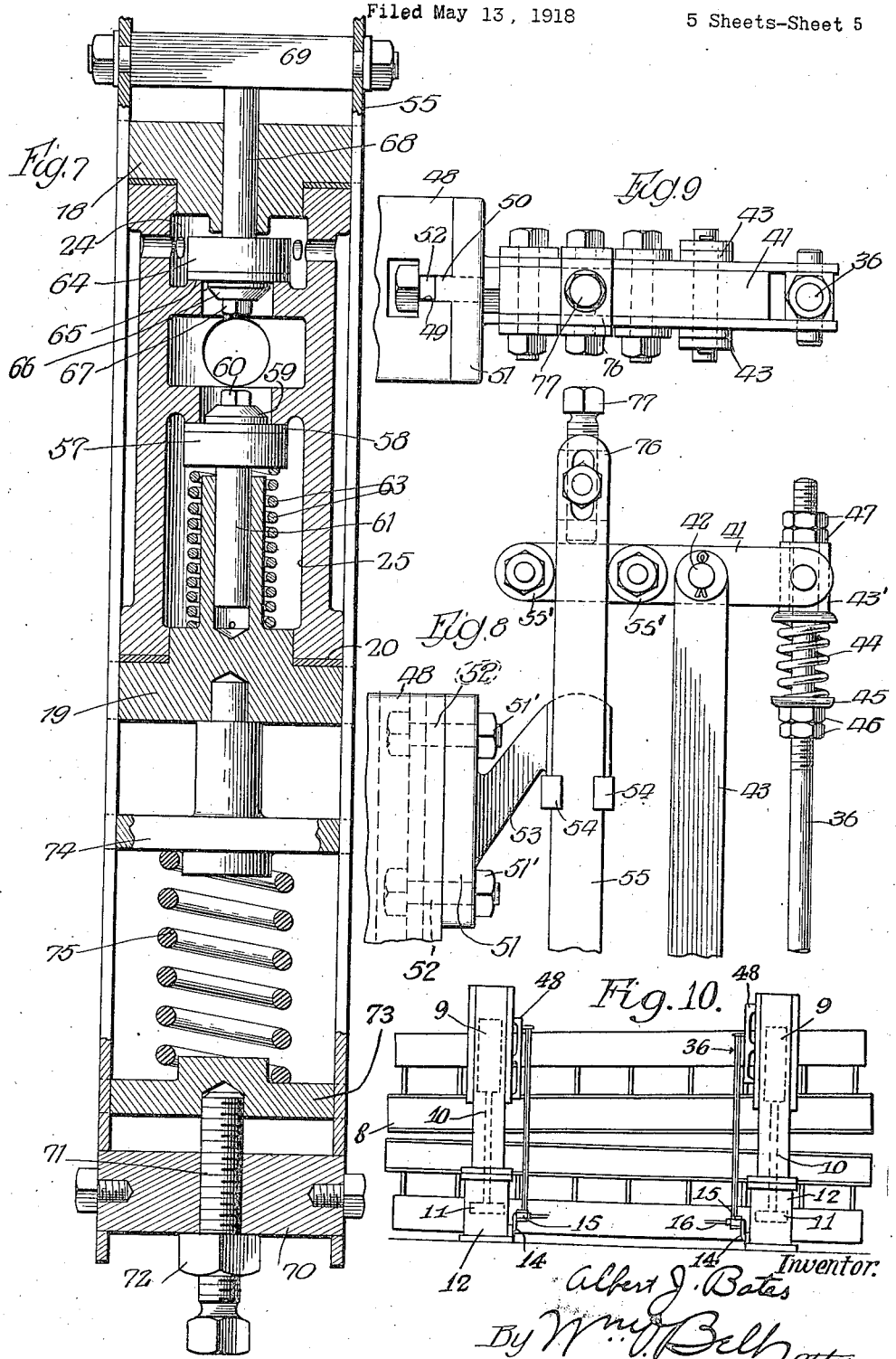

Patented May 15, 1923.

1,455,062

UNITED STATES PATENT OFFICE.

ALBERT J. BATES, OF CHICAGO, ILLINOIS, ASSIGNOR TO BATES EXPANDED STEEL TRUSS CO., OF WILMINGTON, DELAWARE, A CORPORATION OF DELAWARE.

AUTOMATIC HYDRAULIC CONTROL VALVE FOR EXPANDING MACHINES.

Application filed May 13, 1918. Serial No. 234,259.

*To all whom it may concern:*

Be it known that I, ALBERT J. BATES, a citizen of the United States, residing at Chicago, in the county of Cook and State of Illinois, have invented certain new and useful Improvements in Automatic Hydraulic Control Valves for Expanding Machines, of which the following is a specification.

This invention relates to expanding machines actuated by hydraulic pressure, as illustrated and described in Patent No. 1,260,857 granted March 26, 1918, and has for its primary object the provision of means for automatically shutting off the hydraulic pressure when the expansion has reached a predetermined limit whereby members expanded in the expanding machine will not materially vary in dimensions.

A further object of my invention is the provision of an automatic control valve for hydraulic pressure which is substantially instantaneous in operation, and readily adjustable to varying limits of expansion.

A further object of my invention is the provision of an automatic control valve having safety means whereby over expansion is prevented regardless of possible failure to the main valve mechanism and the operator is immediately warned of such failure.

Further objects and advantages of my invention reside in the various combinations hereinafter described and claimed as will be readily understood by reference to the following specification when read in connection with the accompanying drawing illustrating the preferred embodiment thereof, in which Fig. 1 is a vertical section through an expanding machine illustrating the application of my invention thereto;

Fig. 2 is an elevation partially in section similarly indicating the application of my invention to the expanding machine;

Fig. 3 is a detail in section of the control valve with the parts in primary position in which free passage of liquid from the source of pressure through the valve is permitted;

Fig. 4 is a section on the line 4—4 of Fig. 3;

Fig. 7 is a section on the line 7—7 of Fig. 3;

Fig. 8 is an enlarged detail in elevation of a portion of the mechanism;

Fig. 9 is a plan view of a portion of the mechanism illustrated in Fig. 8; and

Fig. 10 is a diagrammatic view illustrating a complete expanding machine.

Figure 1:
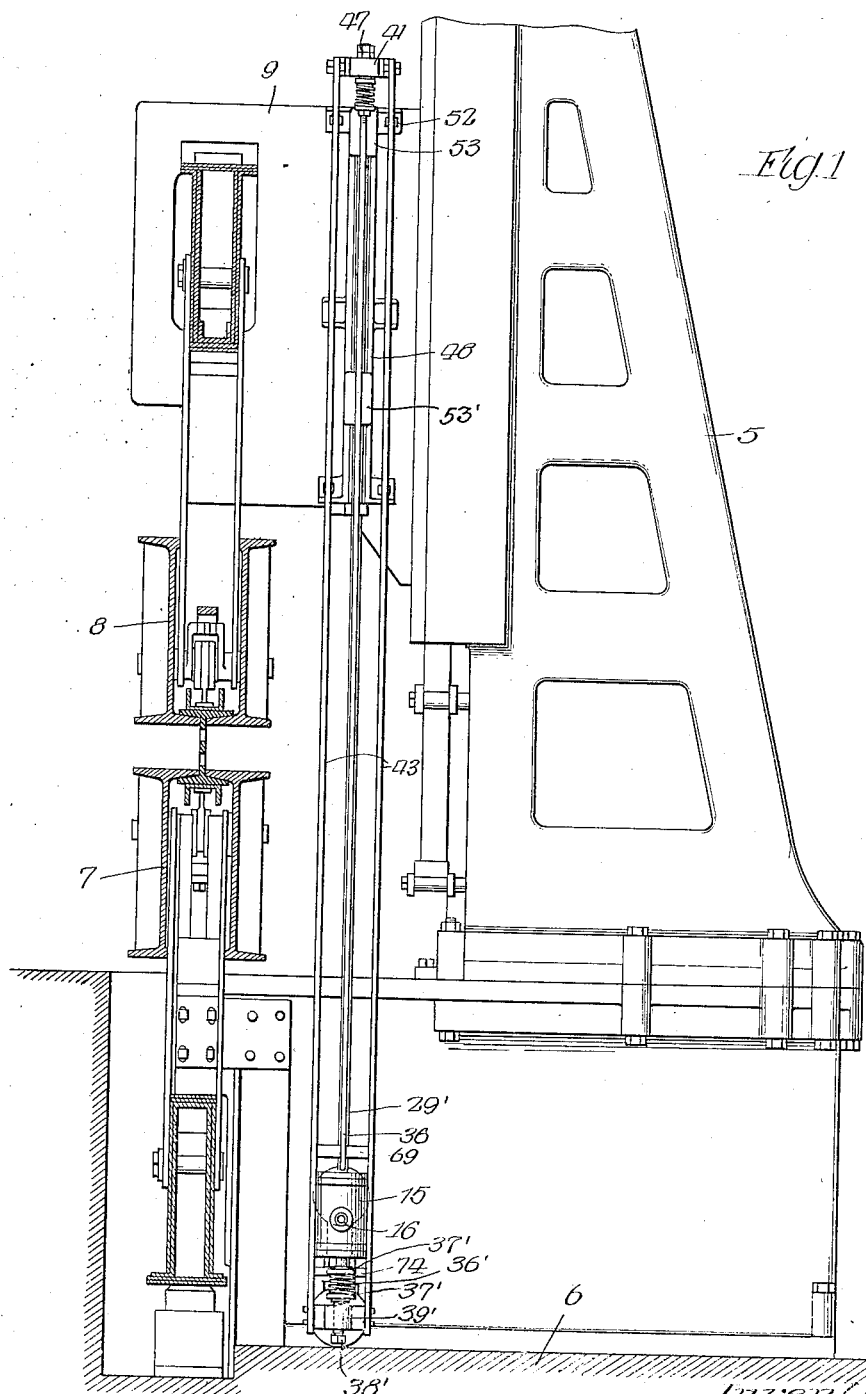

Referring to Figures 1 and 2 of the drawing, the expanding machine is illustrated as comprising uprights 5 forming the frame of the machine and supported on a suitable foundation 6. The gripping and expanding members 7 and 8 are supported for movement relative to the uprights 5, the former being actuated through connection with cross-heads 9 adapted for reciprocating movement on the uprights 5 and actuated by piston rods 10 connected to pistons 11 within the hydraulic cylinders 12. It is to be understood that at least two hydraulic cylinders 12 are provided, one adjacent each end of the machine and each cylinder is independently controlled by the mechanism hereinafter described. The detailed structure of the expanding machine need not be more fully explained herein, reference being made for a complete description thereof to Patent No. 1,260,857.

The cylinders 12 are each provided with an inlet and outlet passage 13 connected by a pipe 14 to a control valve 15, the latter having an inlet and outlet pipe 16 connected with a manually controlled valve (not shown) governing the supply of liquid under hydraulic pressure.

The control valve 15 is illustrated in detail in Figures 3 to 7 inclusive of the drawing. Referring to these figures, 17 indicates a shell or casing and 18 and 19 indicate top and bottom heads, respectively which are securely fastened to the shell with interposed gaskets 20 to prevent leakage from the shell. The shell is provided with a main valve chamber 21, an auxiliary valve chamber 22, a passage 23, a relief valve chamber 24, and a release valve chamber 25 and a release passage 25'.

A carefully machined sleeve 26 is forced into the main valve chamber 21 and is provided with openings 27 communicating with the auxiliary valve chamber 22 and with openings 28 communicating with the passage 23. A valve stem 29 is provided at one end with a bearing in the head 18 and extends within the sleeve 26. Flanged sleeves 30 and 31 on the stem 29 support packings 32, held in position by the washers 33, and a nut 34, and form a piston valve within the main valve chamber 21 adapted to control the flow of liquid from the pipe 16 to the pipe 14 and thence to the hydraulic cylinder 12. The piston valve in the main valve chamber 21 is normally in the position indicated in Figure 3 whereby, as will be readily understood, liquid is permitted to flow from the auxiliary valve chamber 22, through the openings 27, about the flanged sleeve 30, through the openings 28, and into the passage 23. Thus when the operator opens the manually controlled valve (not shown) liquid is admitted to the cylinder 12, whereby the piston 11 is caused to rise and expand the member in the expanding machine.

Figure 5:
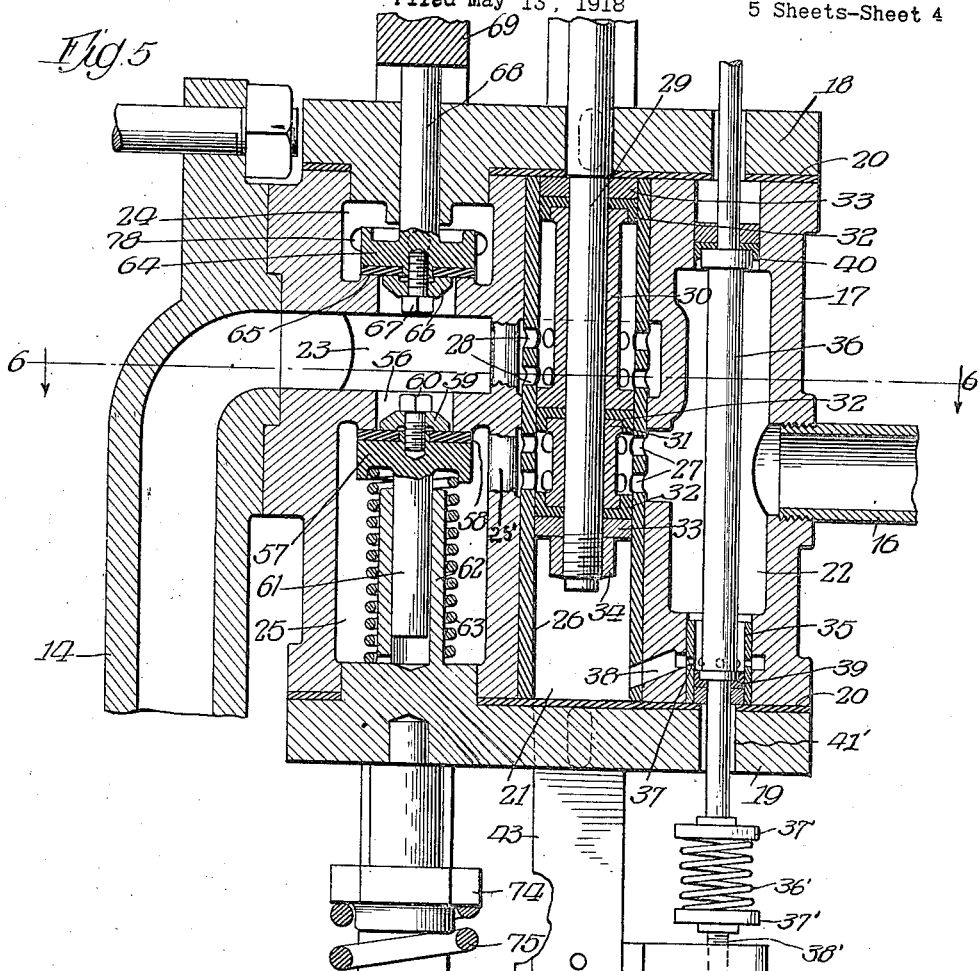
Fig. 5 is a section through the controlling valve with the parts in secondary position in which further passage of liquid from the source of pressure is prevented.
Figure 6:
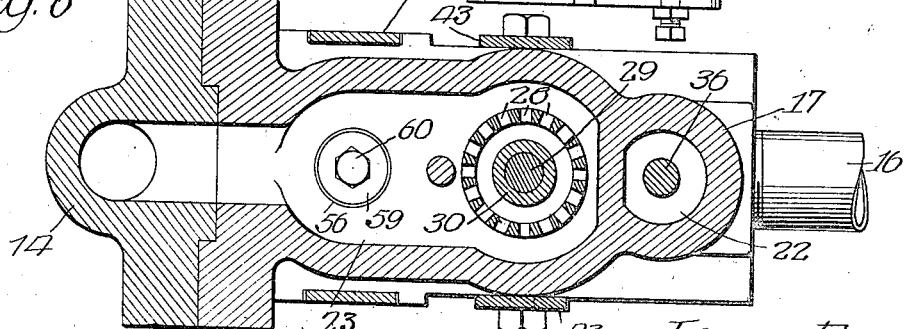
Fig. 6 is a section on the line 6—6 of Fig. 5.

To move the piston valve in the main valve chamber 21 from the position indicated in Figure 3 to that indicated in Figure 5 and thus shut off the supply of liquid, I provide a valve controlling the admission of liquid under pressure from the auxiliary valve chamber to the main valve chamber beneath the piston valve. A carefully machined sleeve 35 is forced under pressure into the lower end of the auxiliary valve chamber 22 and is provided with openings 37 connecting with the passage 38 leading to the main valve chamber 21 beneath the piston valve. A rod 36 is provided with a packing 39, which when the rod 36 is in the position indicated in Fig. 3 prevents the entrance of liquid to the main valve chamber 21 through the passage 38. The rod 36 is also provided with packing 40 at the upper end of the auxiliary valve chamber 22 to prevent the escape of liquid therefrom. The rod 36 extends upwardly, and near the top of the expanding machine, it is connected to a lever 41 pivoted at 42 between vertical straps 43 supported on the valve 15. A lost motion connector is provided between the rod 36 and the lever 41, comprising a sleeve 43' pivoted to the lever 41 and bearing against a spring 44 which rests on the washer 45 held in position on the rod 36 by nuts 46. Nuts 47 above the sleeve 43' permit adjustment of the tension of the spring 44. The purpose of the lost motion connector is to permit additional motion of the lever 41, should any movement occur after the rod 36 has reached the limit of its travel.

A frame 48 is bolted to the side of the cross-head 9 and is provided with a slot 49 (Figs. 8 and 9) to receive a fin 50 on a slide 51 which is normally held in position on the frame 48 by the bolts 52 extending through the slot. Nuts 51' permit locking of the member 51 in any desired position. An arm 53 on the slide 51 is provided with fingers 54 to embrace two straps 55, the upper ends of which are disposed on either side of the lever 41 between washers 55' on the lever. The arm 53 travels with the cross-head 9 and may be adjusted to engage the lever 41 and swing it about its pivot 42 when the cross-head has reached any predetermined position in its upward travel. When the lever 41 is thus turned about its pivot the rod 36 is moved downwardly to carry the valve at the lower end thereof to the position indicated in Fig. 5 and permit liquid to flow through the passage 38 to the main valve chamber. The relative areas of the packings at the top and bottom of the auxiliary valve chamber 22 are such that the pressure of the liquid in the auxiliary valve chamber normally holds the rod 36 in raised position except when it is depressed in the manner hereinbefore described.

To insure return of the rod 36 to raised position particularly when there is no pressure in the auxiliary valve chamber 22, I provide a spring 36' mounted between two plates 37', one supporting the lower end of the rod 36 and the other resting on a screw 38' mounted in a bracket 39' which is in turn supported between the straps 43. The tension of the spring 36' can be adjusted by means of the screw 38' to always hold the rod 36 in raised position except when depressed by the lever 41.

Admission of liquid to the main valve chamber 21 beneath the piston valve immediately moves the valve to the position indicated at Fig. 5 shutting off the flow of liquid from the auxiliary valve chamber 22 to the passage 23 and, consequently, the expansion due to the continued admission of water to the cylinder 12 immediately ceases. This immediate or instantaneous cutting off of the pressure to the cylinder 12 is accomplished by reason of the fact that communication from the auxiliary valve chamber 22 to the bottom of the main valve chamber 21 through the passage 38 is established when the valve 39 passes downwardly past and opens the plurality of ports 37, and, as the piston valve, within the valve chamber 21 is free to move within said chamber, said piston valve moves instantaneously from its position in Figure 3 to its position in Figure 5, thereby instantaneously cutting off the supply of fluid pressure to the cylinder 12, which of course instantaneously stops the upward movement of the expanding member.

When the operator moves the manually controlled valve (not shown) to permit the water in the cylinder 12 to flow to the sump, (not shown) the cross-head 9 moves downwardly. An opening 56 from the passage 23 into the release valve chamber 25 is normally closed by a release valve 57 having a seat 58 held in position by a washer 59 and a screw 60. The valve 57 is provided with a stem 61 slidably supported in a bearing 62 preferably formed integral with the head 19. A spring 63 normally holds the valve in closed position and is assisted by the pressure of the liquid which flows through the openings 27 in the sleeve 26 directly in the release valve chamber. When the pressure is cut off by the operator, in the manner above described, the water from the cylinder 12 flows through the opening 56 into the release valve chamber and thence through the passage 25', openings 27, auxiliary valve chamber 22, and pipe 16 to the sump.

An extension 29' (Fig. 2) of the valve stem 29 is guided in a cross piece 30' between the straps 43 and is disposed in the path of an arm 53' similar to the arm 53 and adjustably mounted by means of bolts 52' on the frame 48. As the cross head 9 approaches its lowest position the arm 53' engages the end of the extension 29' and returns the piston valve in the main valve chamber to its normal position as shown in Fig. 3. As soon as the pressure is released in the auxiliary valve chamber 22 the spring 36' lifts the rod 36. The liquid trapped beneath the piston valve in the main valve chamber then escapes through the passage 38, openings 37 and an opening 41' in the lower head 19 about the rod 36.

It is desirable to provide means to insure shutting off of the water pressure and to warn the operator of the fact that the apparatus is not functioning properly, should an accident prevent the operation of the valve in the main valve chamber. Accordingly, I provide a relief valve 64 having a seat 65 held in position by a washer 66 and a screw 67. The valve is mounted on a stem 68 which engages a cross-bar 69 mounted between the straps 55. The lower ends of the straps are connected by a cross-bar 70. A screw 71 is mounted on the cross bar 70 and is provided with a lock-nut 72. The upper end of the screw 71 supports a follower plate 73 between which and a plate 74 bearing against the head 19, a spring 75 is supported. The tension of the spring may be varied by adjusting the screw 71. The spring 75 is sufficiently strong to withstand the pressure of the liquid as normally applied in the expanding machine and to maintain the valve 64 in closed position. The upper ends of the straps 55 are connected by a cross piece 76 carrying a screw 77, the end of which is disposed in the path of the lever 41. Should the mechanism actuated by the lever fail to shut off the supply of liquid the lever will engage the screw 77 and relieve the pressure of the spring 75 sufficiently to permit the valve 64 to be lifted from its seat by the pressure of the liquid. Openings 78, leading to the atmosphere from the pressure relief chamber 24, permit the liquid to leave the chamber and indicate to the operator that the valve is not in proper working condition. At the same time the pressure is relieved in the cylinder 12 and expansion ceases.

By providing a separate automatic valve of the character described for each of the cylinders of the machine I am enabled to control each independently of the other so that I may set the apparatus to automatically shut off the expansion at any desired point. Should one cylinder operate more rapidly than the other it will cut off when the proper limit of expansion has been reached while the other will continue until it has also expanded the member to the predetermined point. Thus I am enabled to insure not only that the members treated in the expanding machine will not be over expanded, but also that both ends will be expanded to an exactly equal degree, or if desired to a different degree to produce tapered structures. The automatic valve relieves the operator entirely from the necessity of carefully watching the expansion and enables the work to be carried out more rapidly and efficiently.

It will be obvious that various changes may be made in the form, arrangement, and construction of the parts without departing from the spirit and scope of the invention or sacrificing any of its material advantages, the form hereinbefore described being merely a preferred embodiment thereof.

I claim:

1. In an apparatus of the class described, the combination of the movable member of a metal expanding machine, fluid pressure actuated means for moving said movable member, valve-mechanism for the control of fluid pressure, and valve-mechanism actuating-means controlled by the movements of the movable member to cut off the supply of fluid pressure at a predetermined position of the movable member, said valve mechanism including a quick acting valve for immediately cutting off the supply of pressure.

2. In an apparatus of the class described, the combination of the movable member of a metal expanding machine, fluid pressure actuated means for moving said movable member, means for controlling the operation of said fluid pressure actuated means including a quick acting piston valve subject to fluid pressure, and a valve actuated by the movable member to control the supply of fluid pressure to the piston valve, whereby quick operation of the piston valve is effected.

3. In an apparatus of the character described, the combination of an expanding member, means for actuating said member comprising a hydraulic cylinder, a piston in said cylinder, and automatic means to control the flow of liquid to said cylinder to instantaneously stop the movement of said expanding member.

4. In an apparatus of the character described, the combination of an expanding member, a cross head connected to said member, means connected to said cross head for actuating said member and comprising a hydraulic cylinder, a piston in said cylinder, and means operated by said cross head to control the flow of liquid to said cylinder and instantaneously stop the movement of said expanding member.

5. In an apparatus of the character described, the combination of an expanding member, a cross head connected to said member, means connected to said cross head for actuating said member and comprising a hydraulic cylinder, a piston in said cylinder, a quick acting valve to control the supply of liquid to said cylinder, means for actuating said valve, and adjustable means on said cross head to control said valve actuating means.

6. In an apparatus of the character described, the combination of a hydraulically actuated expanding member, a plurality of cylinders spaced apart lengthwise of said member, and automatically actuated means to instantaneously shut off the flow of liquid to each of said cylinders and thereby limit the movement of said member.

7. In an apparatus of the character described, the combination of an expanding member, hydraulic actuating means adjacent the ends of said member, and automatically operated means to instantaneously shut off the supply of liquid to each of said actuating means at a predetermined limit of movement of said member.

8. In an apparatus of the character described, the combination of an expanding member, hydraulic actuating means adjacent the ends of said member, automatically operated means to instantaneously shut off the supply of liquid to each of said actuating means at a predetermined limit of movement of said member, and adjusting means for each of said operating means to vary the limit of movement of said member.

9. In an apparatus of the character described, the combination of a hydraulic cylinder, a casing, a main valve chamber in said casing, a passage between said main valve chamber and said cylinder, a piston valve in said main valve chamber, an auxiliary chamber communicating with said main valve chamber, means for admitting liquid from said auxiliary valve chamber to said main valve chamber below said piston, a release valve chamber, a valve in said release valve chamber, a passage connecting said release valve chamber and said first mentioned passage and a passage connecting said release valve chamber and said main valve chamber.

10. In an automatic control valve for hydraulic pressure, the combination of a casing, a main valve chamber therein, a piston valve operating in said chamber, an auxiliary valve chamber communicating with the main valve chamber, means for admitting liquid from the auxiliary valve chamber to the main valve chamber below said piston valve, a release valve chamber, a valve in said release valve chamber, a relief valve chamber, a valve in said relief valve chamber, and a passage communicating with said chambers.

11. In an automatic control valve for hydraulic pressure, the combination of a casing having a main valve chamber, a passage leading therefrom, an auxiliary valve chamber communicating with said passage through the main valve chamber, a piston valve in said main valve chamber controlling communication with said passage, a passage connecting the auxiliary valve chamber to the bottom of the main valve chamber to admit fluid to said main valve chamber to actuate said piston valve and an auxiliary valve in said auxiliary valve chamber controlling the flow of liquid through said last mentioned passage to said main valve chamber beneath said piston valve.

12. In an automatic control valve for hydraulic pressure, the combination of a casing having a main valve chamber, a passage leading therefrom, an auxiliary valve chamber communicating with said passage through the main valve chamber to supply hydraulic pressure, a piston valve in said main valve chamber controlling communication with said passage, another passage connecting the auxiliary valve chamber to the bottom of the main valve chamber to admit fluid to said main chamber to actuate said piston valve, an auxiliary valve in said auxiliary valve chamber controlling the flow of liquid through said last mentioned passage to said main valve chamber beneath said piston valve, and means outside said auxiliary valve chamber for actuating said auxiliary valve.

13. In an automatic control valve for hydraulic pressure, the combination of a casing having a main valve chamber, a passage leading therefrom, an auxiliary valve chamber communicating with said passage through the main valve chamber, a piston valve in said main valve chamber controlling the flow of liquid from the auxiliary valve chamber to said passage, a passage connecting said main and auxiliary valve chambers beneath said piston valve, an auxiliary valve normally closing the last mentioned passage, and means outside said auxiliary valve chamber for actuating said auxiliary valve to admit liquid to the bottom of said main valve chamber and thereby actuate said piston valve to shut off the supply of liquid to said first mentioned passage.

14. In an automatic control valve for hydraulic pressure, the combination of a casing having a passage, a release valve chamber, a main valve chamber communicating with said passage and said release valve chamber, an auxiliary valve chamber communicating with said main valve chamber, a piston valve in said main valve chamber, and means for operating said piston valve to establish communication through the main valve chamber between the auxiliary valve chamber and said passage or between said auxiliary valve chamber and the release valve chamber.

15. In an automatic control for hydraulic pressure, the combination with a movable member actuated by hydraulic pressure, of a casing having a main valve chamber and a passage communicating therewith, a valve in said chamber, means actuated by said movable member to control said valve to shut off the flow of fluid from said chamber to said passage, and relief means automatically operable by said movable member to permit the escape of liquid from said passage upon failure of said valve.

16. In an automatic control for hydraulic pressure, the combination with a movable member actuated by hydraulic pressure, of a casing having a main valve chamber and a passage communicating therewith, a valve in said chamber, means actuated by said movable member to control said valve to shut off the flow of liquid from said chamber to said passage, a relief valve chamber communicating with said passage and with the atmosphere, and a relief valve in the latter chamber and automatically operable by said movable member upon failure of the valve in the main valve chamber to permit the escape of fluid from said passage.

17. In an automatic control for hydraulic pressure, the combination with a movable member actuated by hydraulic pressure of a casing having a main valve chamber, an auxiliary valve chamber, a relief valve chamber, and a pasage communicating with said main and relief valve chambers, a piston valve in said main valve chamber, an auxiliary valve in said auxiliary valve chamber, means controlling said auxiliary valve to admit liquid to said main valve chamber beneath said piston valve to move the latter and thereby close communication between said main valve chamber and passage, and a valve in said relief valve chamber and automatically operable by said movable member upon failure of said piston valve to permit escape of liquid from said passage.

18. In an apparatus of the character described, the combination of hydraulically actuated expanding means, a main controlling valve mechanism therefor including relief means permitting escape of liquid to the atmosphere, means controlled by the movement of said expanding means to automatically and instantaneously cut off the supply of liquid at a predetermined point in the travel of said expanding means, and means operative upon further movement of said expanding means to actuate said relief means.

19. In an apparatus of the character described, the combination of hydraulically actuated expanding means, a main controlling valve therefor adapted for instantaneous operation when said expanding means reaches a predetermined point in its travel, a relief valve associated with said controlling valve, and means controlled by the movement of said expanding means to actuate said relief valve to permit escape of said liquid.

20. In an apparatus of the character described, the combination of hydraulically actuated expanding means, a main controlling valve therefor adapted for instantaneous operation when said expanding means reaches a predetermined point in its travel, a relief valve associated with said controlling valve, means controlled by the movement of said expanding means to actuate said controlling and relief valves, and means for adjusting the valve actuating means.

21. In an apparatus of the character described, the combination of hydraulically actuated expanding means, a main controlling valve therefor adapted for instantaneous operation when said expanding means reaches a predetermined point in its travel, means for operating said main controlling valve comprising a lever adapted to be operated by said expanding means, a relief valve associated with said controlling valve, and means adapted to be operated by said lever to open said relief valve in event of the failure of the operating means to close the main controlling valve.

ALBERT J. BATES.

Witness:
A. G. SCHIRP.